(12) United States Patent
Nishikawa et al.

(10) Patent No.: US 8,602,563 B2
(45) Date of Patent: Dec. 10, 2013

(54) PROJECTION IMAGE DISPLAY APPARATUS AND PROJECTION OPTICAL SYSTEM

(75) Inventors: Jun Nishikawa, Tokyo (JP); Hideki Yamamoto, Kanagawa (JP); Junichi Iwai, Kanagawa (JP)

(73) Assignee: Sony Corporation (JP)

( * ) Notice: Subject to any disclaimer, the term of this patent is extended or adjusted under 35 U.S.C. 154(b) by 465 days.

(21) Appl. No.: 12/655,994

(22) Filed: Jan. 12, 2010

(65) Prior Publication Data

US 2010/0182571 A1    Jul. 22, 2010

(30) Foreign Application Priority Data

Jan. 16, 2009    (JP) ................ P2009-007347

(51) Int. Cl.
| | | |
|---|---|---|
| G03B 21/26 | (2006.01) | |
| G03B 21/14 | (2006.01) | |
| G03B 21/28 | (2006.01) | |
| G02B 5/30 | (2006.01) | |
| G02B 27/28 | (2006.01) | |
| H04N 9/69 | (2006.01) | |

(52) U.S. Cl.
USPC .......... 353/30; 353/20; 353/37; 353/81; 353/97; 353/98; 359/487.04; 359/489.08; 359/583; 348/757

(58) Field of Classification Search
USPC .............. 353/30, 20, 37, 81, 97, 98, 99; 359/487.04, 489.08, 583; 348/757
See application file for complete search history.

(56) References Cited

U.S. PATENT DOCUMENTS

| 7,059,728 B2* | 6/2006 | Alasaarela et al. ........... 353/94 |
|---|---|---|
| 7,607,779 B2 | 10/2009 | Sonehara | |
| 2008/0143965 A1* | 6/2008 | Cowan et al. ........... 353/8 |
| 2008/0225236 A1* | 9/2008 | Schuck et al. ........... 353/20 |

FOREIGN PATENT DOCUMENTS

| JP | 11084314 A | 3/1999 |
|---|---|---|
| JP | 2004-279847 A | 10/2004 |
| JP | 2006235566 A | 9/2006 |
| JP | 2006-276101 A | 10/2006 |
| JP | 2007206343 A | 8/2007 |
| JP | 2007-271828 A | 10/2007 |
| JP | 4052315 B2 | 12/2007 |
| JP | 2008046621 A | 2/2008 |
| JP | 2008065137 A | 3/2008 |

OTHER PUBLICATIONS

Office Action from Japanese Application No. 2009-007347, dated Nov. 6, 2012.

* cited by examiner

*Primary Examiner* — Georgia Y Epps
*Assistant Examiner* — Magda Cruz
(74) *Attorney, Agent, or Firm* — Lerner, David, Littenberg, Krumholz & Mentlik, LLP

(57) ABSTRACT

A projection image display apparatus includes: a light source; an illumination optical system that uniformly irradiates a surface of an image modulation element serving as a primary image surface with a light beam emitted from the light source; and a projection optical system that enlarges and projects image information on the primary image surface modulated by the image modulation element onto a screen serving as a secondary image surface, and that includes a first optical system that forms an intermediate image from the image information, a single-image second optical system that enlarges and projects the intermediate image to display a single image on the screen, a plural-image second optical system that enlarges and projects the intermediate image to display plural images on the screen, and an optical path switching mechanism that selectively guides a light beam from the first optical system to the single-image or plural-image second optical system.

12 Claims, 11 Drawing Sheets

PROJECTION IMAGE DISPLAY APPARATUS AND PROJECTION OPTICAL SYSTEM

CROSS-REFERENCE TO RELATED APPLICATION

The present application claims priority from Japanese Patent Application No. JP 2009-007347 filed in the Japanese Patent Office on Jan. 16, 2009, the entire content of which is incorporated herein by reference.

BACKGROUND OF THE INVENTION

1. Field of the Invention

The present invention relates to a projection image display apparatus that displays a projection image on a screen and a projection optical system for use in the projection image display apparatus.

2. Description of the Related Art

In recent years, projector apparatuses have been widely used as projection image display apparatuses that display a projection image on a screen. Use of projector apparatuses facilitates upsizing of a display screen while maintaining a high resolution compared to flat panel display apparatuses such as LCDs (Liquid Crystal Displays) and PDPs (Plasma Display Panels).

Some projector apparatuses are configured to output a plurality of images for display.

In one such example, one projector apparatus projects a right-eye image and a left-eye image on each of two screens in a time-sharing manner, providing parallax between the images on the screens (see Japanese Patent No. 4052315, for example). When the thus configured projector apparatus is used, the right-eye image and the left-eye image are alternately incident on the eyes of a viewer, allowing the viewer to recognize a stereoscopic image.

In another example, the display area of a display device such as a liquid crystal display element is divided into two, and a right-eye image and a left-eye image are displayed in each of the display areas at the same time to form a stereoscopic image (see Japanese Unexamined Patent Application Publication No. 2007-271828, for example). In the projector apparatus, a relay optical system for sectioning an image is provided between a projection optical system and a display device, and once an image is formed by the relay optical system, two sections of the image are split from each other by reflective surfaces.

In still another example, an optical path switching section that switches optical paths in a time-sharing manner is provided between a projection optical system and a screen, and a plurality of images are formed side by side on the left and the right of a screen using projection light that has passed through each of the paths (see Japanese Unexamined Patent Application Publication No. 2004-279847, for example). When the thus configured projector apparatus is used, the single projector apparatus outputs for display a wide-screen image in which a plurality of images are formed side by side on the left and the right.

SUMMARY OF THE INVENTION

The projector apparatuses according to the related art discussed above are configured to output a plurality of images for display, and thus support a stereoscopic image or a wide-screen image. In the case where the projector apparatuses are configured to output a plurality of images for display, however, it may be difficult to display a single image on a screen using the full resolving power of a display device while maintaining a high resolution.

For example, most movie theaters and home theater systems output an ordinary, two-dimensional video content for display on a single screen. Thus, in order to support a video content for which a display output of a plurality of images is necessary, it is necessary to prepare two projector apparatuses, or to replace a projection optical system of a projector apparatus.

That is, in an attempt to support both a video content for display of a single image on a single screen and a video content for which a display output of a plurality of image is necessary with the projector apparatuses according to the related art, it is inevitable that the cost and/or the size of the apparatus increases, or that troublesome replacement work is incurred.

It is therefore desirable to provide a projection image display apparatus that outputs both a plurality of images for display and a single image for display with the single apparatus in accordance with the use status without replacing the projection optical system, and a projection optical system for use in the projection image display apparatus.

According to an embodiment of the present invention, there is provided a projection image display apparatus including: a light source; an illumination optical system that uniformly irradiates a surface of an image modulation element, which serves as a primary image surface, with a light beam emitted from the light source; and a projection optical system that enlarges and projects image information on the primary image surface modulated by the image modulation element onto a screen which serves as a secondary image surface, in which the projection optical system includes a first optical system that forms an intermediate image on the basis of the image information on the primary image surface; a single-image second optical system that enlarges and projects the intermediate image to output a single image for display on the screen; a plural-image second optical system that enlarges and projects the intermediate image to output a plurality of images for display on the screen; and an optical path switching mechanism that selectively guides a light beam from the first optical system to either of the single-image second optical system and the plural-image second optical system.

With the projection image display apparatus configured as described above, when the light beam from the first optical system is guided to the single-image second optical system, a single image is output for display on a single screen. Meanwhile, when the light beam from the first optical system is guided to the plural-image second optical system, a plurality of images are output for display on the screen. That is, it is selectively determined on the basis of the results of an optical path switching operation performed by the optical path switching mechanism whether to output a single image for display on the screen or to output a plurality of images for display on the screen.

According to the present invention, it is possible to output both a single image and a plurality of images for display on a screen with only one projection image display apparatus without replacing the projection optical system, by an optical path switching operation performed by an optical path switching mechanism. Thus, it is possible to support various video contents without increasing the cost or the size of the apparatus or incurring troublesome replacement work.

DESCRIPTION OF THE PREFERRED EMBODIMENTS

A projection image display apparatus and a projection optical system according to embodiments of the present invention will be described below with reference to the drawings.

{Exemplary Schematic Configuration of Projection Image Display Apparatus}

First of all, a schematic configuration of the projection image display apparatus is briefly described using a liquid crystal projector apparatus as an example.

The liquid crystal projector apparatus includes, provided in its housing, a light source, an illumination optical system, and a projection optical system. Light emitted from the light source is modulated by a liquid crystal display element, which serves as an image modulation element, to form an optical image in accordance with a video signal. The optical image is enlarged and projected by the projection optical system for display on a screen. As such a liquid crystal projector apparatus, a so-called 3-LCD projector apparatus which includes panel-like liquid crystal display elements respectively corresponding to R (red), G (green), and B (blue) colors is widely used. In the description below, a panel-like liquid crystal display element is occasionally simply referred to as "liquid crystal panel".

Figure 1:
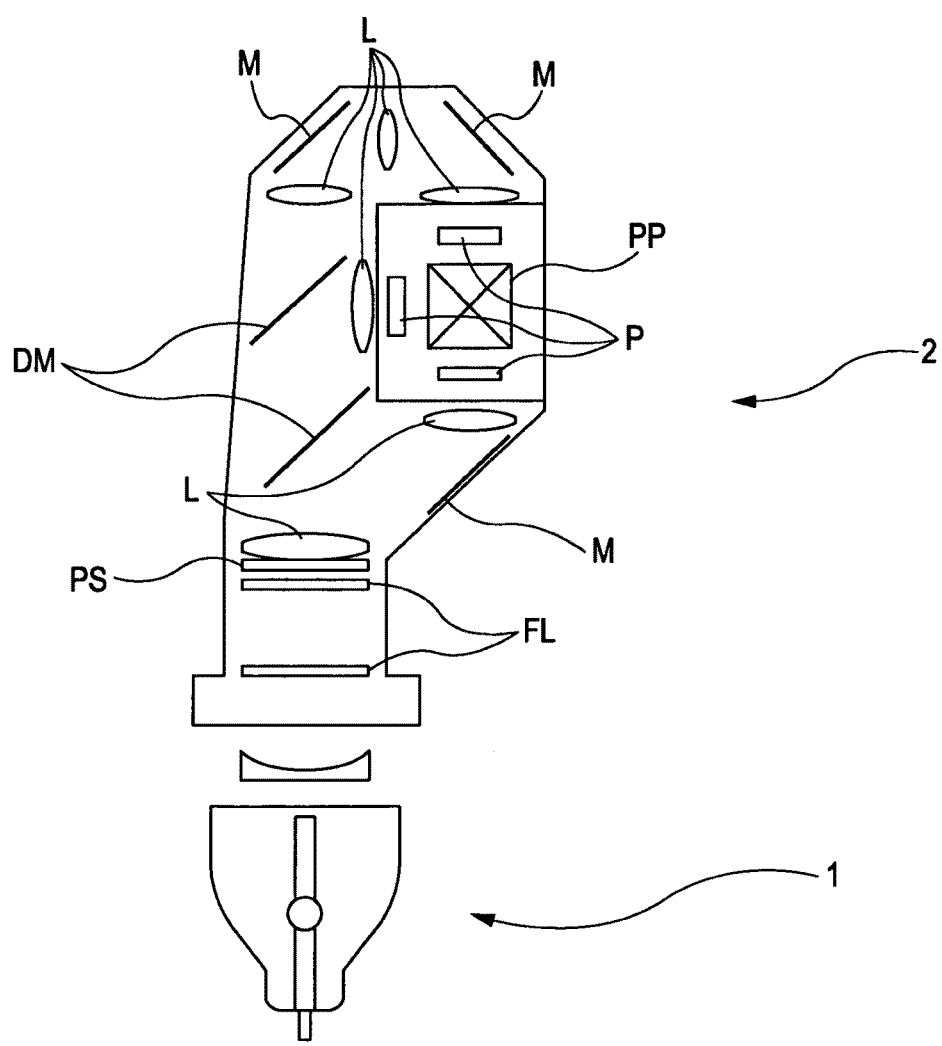
FIG. 1 illustrates an exemplary schematic configuration of a light source and an illumination optical system of a liquid crystal projector apparatus.

FIG. 1 illustrates an exemplary schematic configuration of a light source 1 and an illumination optical system 2 of a liquid crystal projector apparatus.

The light source 1 emits a light beam toward the illumination optical system 2, and may be a high-pressure mercury lamp, for example.

The illumination optical system 2 uniformly irradiates a surface of an image modulation element (liquid crystal panel), which serves as a primary image surface, with the light beam emitted from the light source 1. More specifically, in the illumination optical system 2, the light beam from the light source 1 passes through first and second fly-eye lenses FL, a polarization conversion element PS, and a condensing lens L. After passing through these components, the light beam is separated by a dichroic mirror DM, which reflects only light in a specific wavelength band, into respective color (R,G, and B) light components. The respective color (R,G, and B) light components are incident on liquid crystal panels P provided in correspondence with the R, G, and B colors utilizing total reflection mirrors M and lenses L. After light modulation performed by the liquid crystal panels P in accordance with a video signal, the respective light-modulated color light components are synthesized by a dichroic prism PP, and emitted toward the projection optical system (not shown).

Although the illumination optical system 2 is formed using a transmissive liquid crystal panel in the above description, the illumination optical system 2 may also be formed using a reflective liquid crystal panel. The image modulation element may be a digital micromirror device (DMD), for example. It is also possible to use a polarization beam splitter (PBS), a color synthesis prism that synthesizes video signals for respective (R, G, and B) colors, and a TIR (Total Internal Reflection) prism in place of the dichroic prism PP.

{Exemplary Configuration of Projection Optical System}

The liquid crystal projector apparatus further includes a projection optical system in addition to the light source 1 and the illumination optical system 2 described above.

When the projection optical system receives light emitted from the illumination optical system 2, the projection optical system enlarges and projects image information on the primary image surface modulated by the liquid crystal panels P of the illumination optical system 2 onto a screen which serves as a secondary image surface.

The liquid crystal projector apparatus described herein has an advantage in its projection optical system.

The configuration of the projection optical system is described sequentially using first to seventh embodiments as examples.

<First Embodiment>

Figure 2A:
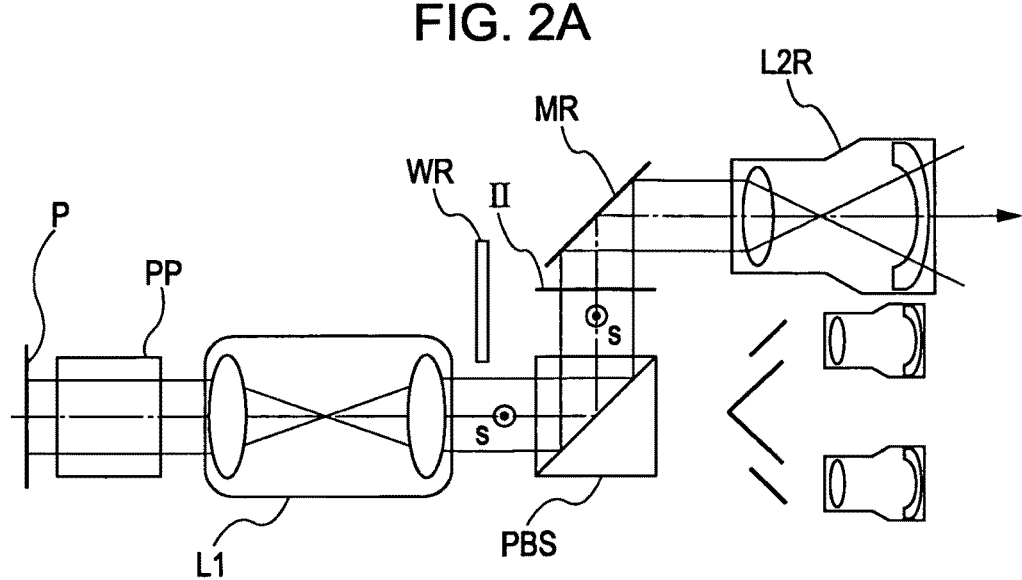
FIG. 2A illustrates an exemplary schematic configuration of a projection optical system according to a first embodiment, showing a state in which a λ/2 retardation film is not provided on an optical path between a first optical system and a polarization beam splitter.
Figure 2B:
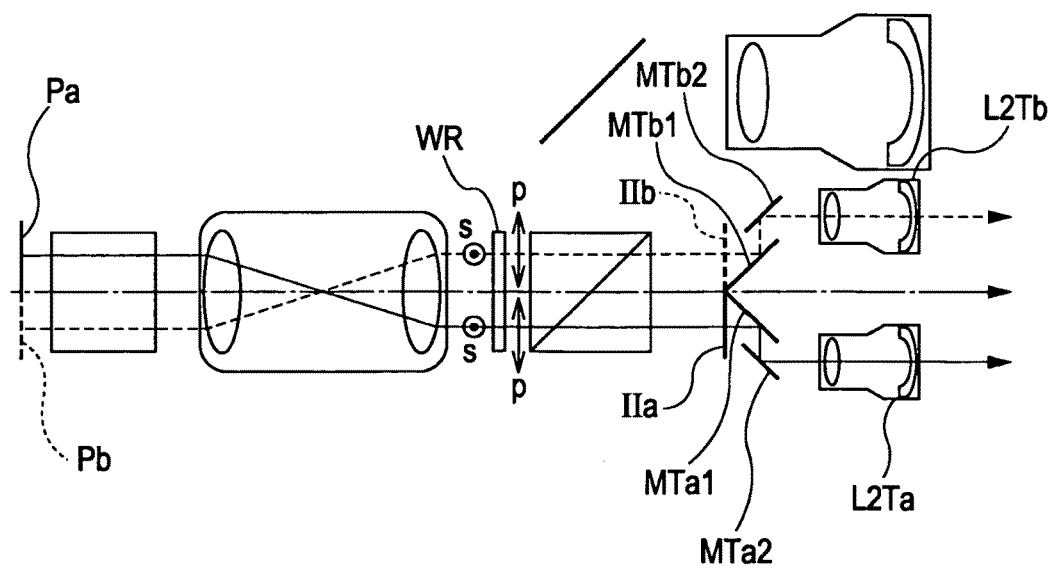
FIG. 2B illustrates an exemplary schematic configuration of the projection optical system according to the first embodiment, showing a state in which the λ/2 retardation film is provided on the optical path between the first optical system and the polarization beam splitter.

FIGS. 2A and 2B illustrate an exemplary schematic configuration of a projection optical system according to a first embodiment.

As in the example shown, the projection optical system is configured to perform enlarged projection from a primary image surface on the small-scale side to a secondary image surface on the large-scale side. That is, image information on the primary image surface obtained by modulation performed by the liquid crystal panel and synthesis performed by the dichroic prism PP in the illumination optical system 2 is enlarged and projected onto a screen which serves as the secondary image surface.

For this purpose, the projection optical system includes a first optical system L1 that forms an intermediate image on the basis of the image information on the primary image surface, and a second optical system that enlarges and projects the intermediate image to output an image for display on the screen.

The second optical system includes, provided side by side, a single-image second optical system L2R that outputs a single image for display on the screen, and plural-image second optical systems L2Ta and L2Tb that output a plurality of images for display on the screen.

Along with the single-image second optical system L2R and the plural-image second optical systems L2Ta and L2Tb provided side by side, a λ/2 retardation film WR and a polarization beam splitter PBS are disposed between the single-image second optical system L2R and the plural-image second optical systems L2Ta and L2Tb.

The λ/2 retardation film WR changes the polarization direction of a light beam from the first optical system L1 to a specific polarization direction. For example, the λ/2 retardation film WR converts s-polarized light into p-polarized light, and vice versa. The λ/2 retardation film WR is movable between a position on an optical path between the first optical system L1 and the polarization beam splitter PBS and a position not on the optical path therebetween. The λ/2 retardation film WR is moved by a retardation film moving mechanism (not shown). The retardation film moving mechanism, irrespective of whether it is manually or automatically operated, may be implemented utilizing the related art, and is not described herein.

The polarization beam splitter PBS is configured to reflect an s-polarized light beam and to transmit a p-polarized light beam, for example.

The λ/2 retardation film WR, the retardation film moving mechanism, and the polarization beam splitter PBS function as an optical path switching mechanism that selectively guides the light beam from the first optical system L1 to either of the single-image second optical system L2R and the plural-image second optical systems L2Ta and L2Tb.

A flat reflective surface M2R, which may include a mirror, is disposed between the polarization beam splitter PBS and the single-image second optical system L2R to change the traveling direction of the light beam. A plurality of flat reflective surfaces MTa1, MTa2, MTb1, and MTb2, each of which may include a mirror, are disposed between the polarization beam splitter PBS and the plural-image second optical systems L2Ta and L2Tb to change the traveling direction of the light beam.

A case has been considered where an s-polarized light beam is emitted from the liquid crystal panel, for example, in the thus configured projection optical system. In the drawing, double circle marks indicate s-polarized light (which vibrates in the depth direction in the drawing), and vertical arrows indicate p-polarized light (which vibrates in the vertical direction in the drawing).

In the state in which the λ/2 retardation film WR is not interposed between the first optical system L1 and the polarization beam splitter PBS as shown in FIG. 2A, the light beam emitted from the liquid crystal panel P passes through the dichroic prism PP and the first optical system L1. Then, the first optical system L1 forms an intermediate image II on the basis of the image information on the primary image surface on a surface of the liquid crystal panel P.

The light beam before the polarization beam splitter PBS contains s-polarized light. That is, the light beam which remains in an s-polarized light beam is incident on the polarization beam splitter PBS in the state in which the λ/2 retardation film WR is not interposed on the optical path. Thus, the light beam which has passed through the first optical system L1 is reflected by the polarization beam splitter PBS.

The light beam reflected by the polarization beam splitter PBS has its traveling direction changed by the flat reflective surface M2R, and is incident on the single-image second optical system L2R. The light beam which has passed through the single-image second optical system L2R is enlarged and projected to form an image on the secondary image surface.

Meanwhile, in the state in which the λ/2 retardation film WR is interposed between the first optical system L1 and the polarization beam splitter PBS as shown in FIG. 2B, the light beam emitted from the liquid crystal panels Pa and Pb also passes through the dichroic prism PP and the first optical system L1. It should be noted that image information on the primary image surface has been divided into a plurality of pieces of image information on surfaces of the liquid crystal panels Pa and Pb so as to correspond to a plurality of images (for example, a right-eye image and a left-eye image) to be output for display. The first optical system L1 forms intermediate images IIa and IIb on the basis of the respective pieces of image information on the surfaces of the liquid crystal panels Pa and Pb. That is, an intermediate image IIa is formed on the basis of the light beam emitted from the liquid crystal panel Pa, and an intermediate image IIb is formed on the basis of the light beam emitted from the liquid crystal panel Pb.

With the presence of the λ/2 retardation film WR which rotates the polarization direction by 90 degrees, the light beam before the polarization beam splitter PBS contains p-polarized light. That is, the light beam after being converted from s-polarized light into p-polarized light is incident on the polarization beam splitter PBS in the state in which the λ/2 retardation film WR is interposed on the optical path. Thus, the light beam which has passed through the first optical system L1 passes through the polarization beam splitter PBS.

The light beam which has passed through the polarization beam splitter PBS has its traveling direction changed by the flat reflective surfaces MTa1, MTa2, MTb1, and MTb2, and is incident on the plural-image second optical systems L2Ta and L2Tb. That is, the light beam emitted from the liquid crystal panel Pa forms the intermediate image IIa, then has its traveling direction changed by the flat reflective surfaces MTa1 and MTa2, and is incident on the plural-image second optical system L2Ta. The light beam emitted from the liquid crystal panel Pb forms the intermediate image IIb, then has its traveling direction changed by the flat reflective surfaces MTb1 and MTb2, and is incident on the plural-image second optical system L2Tb. The respective light beams which have passed through the plural-image second optical systems L2Ta and L2Tb are enlarged and projected to form an image on the secondary image surface.

In the projection optical system configured as described above, when the light beam from the first optical system L1 is guided to the single-image second optical system L2R, a single image is output for display on a single screen. Meanwhile, when the light beam from the first optical system L1 is guided to the plural-image second optical systems L2Ta and L2Tb, a plurality of images are output for display on the screen. That is, the optical path is switched by placing the $\lambda/2$ retardation film WR in and removing it from the optical path in order to change or not change the polarization direction of the light beam. It is selectively determined on the basis of the results of switching the optical path whether to output a single image for display on the screen or to output a plurality of images for display on the screen.

Thus, a liquid crystal projector apparatus which includes the projection optical system configured as described above makes it possible to output both a plurality of images for display and a single image for display with only one liquid crystal projector apparatus without replacing the projection optical system. That is, it is possible to support various video contents, without increasing the cost or the size of the apparatus or incurring troublesome replacement work, by switching the optical path by placing the $\lambda/2$ retardation film WR in and removing it from the optical path in order to change or not change the polarization direction of the light beam.

<Second Embodiment>

Figure 3A:
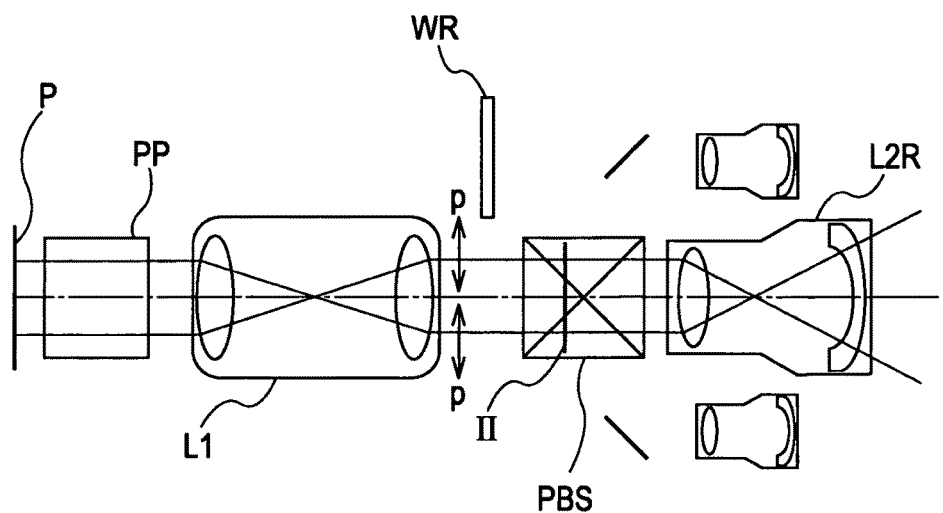
FIG. 3A illustrates an exemplary schematic configuration of a projection optical system according to a second embodiment, showing a state in which a λ/2 retardation film is not provided on an optical path between a first optical system and a polarization beam splitter.
Figure 3B:
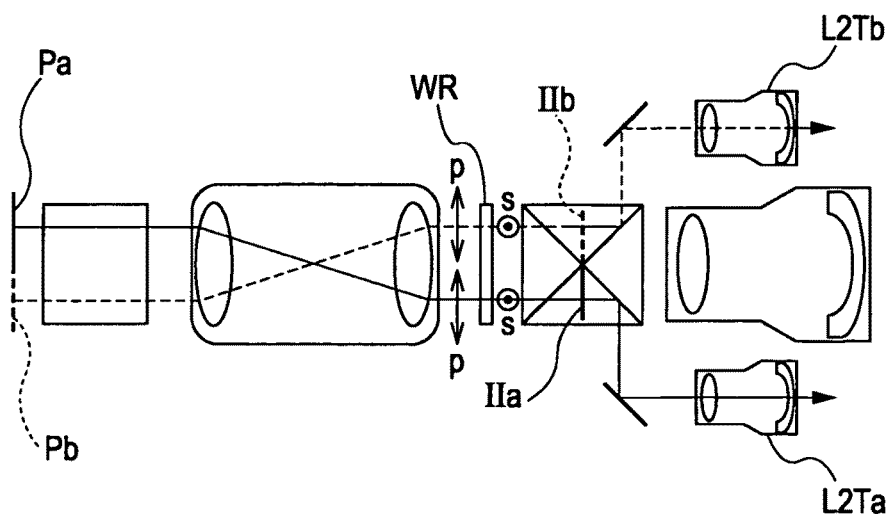
FIG. 3B illustrates an exemplary schematic configuration of the projection optical system according to the second embodiment, showing a state in which the λ/2 retardation film is provided on the optical path between the first optical system and the polarization beam splitter.

FIGS. 3A and 3B illustrate an exemplary schematic configuration of a projection optical system according to a second embodiment. Here, only differences from the first embodiment discussed above are described.

In the projection optical system shown, the plural-image second optical systems L2Ta and L2Tb are respectively disposed on both sides of the single-image second optical system L2R. Correspondingly, the polarization beam splitter PBS is adapted to split and reflect the light beam from the first optical system L1 to both the plural-image second optical systems L2Ta and L2Tb.

The polarization beam splitter PBS is configured to split and reflect an s-polarized light beam and to transmit a p-polarized light beam as it is, for example.

A case has been considered where a p-polarized light beam is emitted from the liquid crystal panel, for example, in the thus configured projection optical system. In the drawing, double circle marks indicate s-polarized light (which vibrates in the depth direction in the drawing), and vertical arrows indicate p-polarized light (which vibrates in the vertical direction in the drawing).

In the state in which the $\lambda/2$ retardation film WR is not interposed between the first optical system L1 and the polarization beam splitter PBS as shown in FIG. 3A, the light beam emitted from the liquid crystal panel P passes through the dichroic prism PP and the first optical system L1. Then, the first optical system L1 forms an intermediate image II on the basis of the image information on the primary image surface on a surface of the liquid crystal panel P.

The light beam before the polarization beam splitter PBS contains p-polarized light. That is, the light beam which remains in a p-polarized light beam is incident on the polarization beam splitter PBS in the state in which the $\lambda/2$ retardation film WR is not interposed on the optical path. Thus, the light beam which has passed through the first optical system L1 passes through the polarization beam splitter PBS as it is.

The light beam which has passed through the polarization beam splitter PBS is incident on the single-image second optical system L2R as it is. The light beam which has passed through the single-image second optical system L2R is enlarged and projected to form an image on the secondary image surface.

Meanwhile, in the state in which the $\lambda/2$ retardation film WR is interposed between the first optical system L1 and the polarization beam splitter PBS as shown in FIG. 3B, the light beam emitted from the liquid crystal panels Pa and Pb also passes through the dichroic prism PP and the first optical system L1. It should be noted that image information on the primary image surface has been divided into a plurality of pieces of image information on surfaces of the liquid crystal panels Pa and Pb so as to correspond to a plurality of images (for example, a right-eye image and a left-eye image) to be output for display. The first optical system L1 forms intermediate images IIa and IIb on the basis of the respective pieces of image information on the surfaces of the liquid crystal panels Pa and Pb. That is, an intermediate image IIa is formed on the basis of the light beam emitted from the liquid crystal panel Pa, and an intermediate image IIb is formed on the basis of the light beam emitted from the liquid crystal panel Pb.

With the presence of the $\lambda/2$ retardation film WR which rotates the polarization direction by 90 degrees, the light beam before the polarization beam splitter PBS contains s-polarized light. That is, the light beam after being converted from p-polarized light into s-polarized light is incident on the polarization beam splitter PBS in the state in which the $\lambda/2$ retardation film WR is interposed on the optical path. Thus, the light beam which has passed through the first optical system L1 is split and reflected by the polarization beam splitter PBS.

The light beams split and reflected by the polarization beam splitter PBS have their traveling direction changed by the flat reflective surfaces MTa2 and MTb2, and are incident on the plural-image second optical systems L2Ta and L2Tb. That is, the light beam emitted from the liquid crystal panel Pa forms the intermediate image IIa, then has its traveling direction changed by the flat reflective surface MTa2, and is incident on the plural-image second optical system L2Ta. The light beam emitted from the liquid crystal panel Pb forms the intermediate image IIb, then has its traveling direction changed by the flat reflective surface MTb2, and is incident on the plural-image second optical system L2Tb. The respective light beams which have passed through the plural-image second optical systems L2Ta and L2Tb are enlarged and projected to form an image on the secondary image surface.

In the projection optical system configured as described above, as in the case of the first embodiment discussed above, the optical path is switched by placing the $\lambda/2$ retardation film WR in and removing it from the optical path in order to change or not change the polarization direction of the light beam. It is selectively determined on the basis of the results of switching the optical path whether to output a single image for display on the screen or to output a plurality of images for display on the screen.

Thus, a liquid crystal projector apparatus which includes the projection optical system configured as described above makes it possible to output both a plurality of images for display and a single image for display with only one liquid crystal projector apparatus without replacing the projection optical system. That is, it is possible to support various video contents, without increasing the cost or the size of the apparatus or incurring troublesome replacement work, by switching the optical path by placing the λ/2 retardation film WR in and removing it from the optical path in order to change or not change the polarization direction of the light beam.

<Third Embodiment>

Figure 4A:
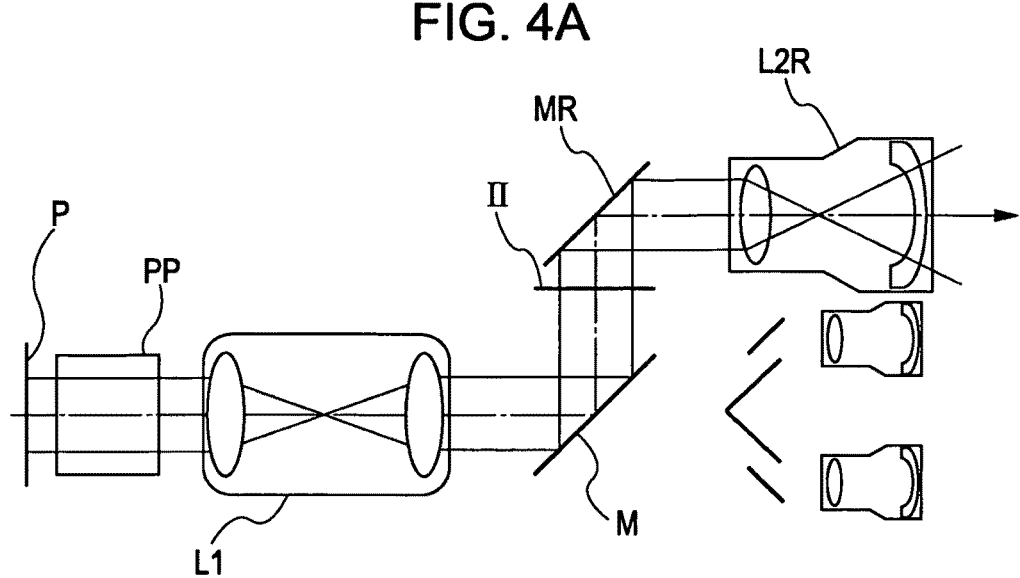
FIG. 4A illustrates an exemplary schematic configuration of a projection optical system according to a third embodiment, showing a state in which a mirror is provided on an optical path of a light beam from a first optical system.
Figure 4B:
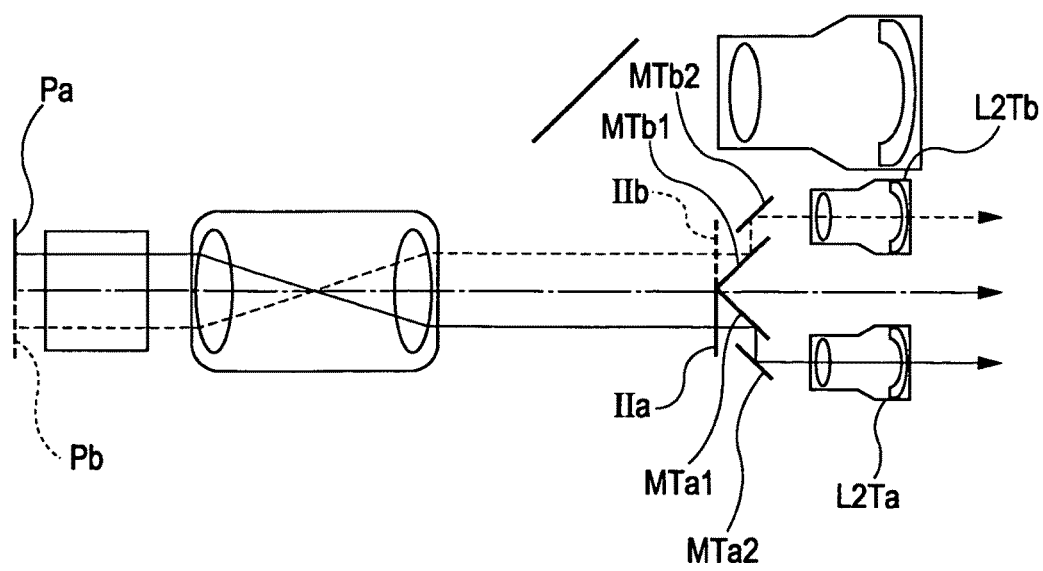
FIG. 4B illustrates an exemplary schematic configuration of the projection optical system according to the third embodiment, showing a state in which the mirror is not provided on the optical path of the light beam from the first optical system.

FIGS. 4A and 4B illustrate an exemplary schematic configuration of a projection optical system according to a third embodiment. Here, also, only differences from the first embodiment discussed above are described.

In the projection optical system shown, a mirror M is disposed between the first optical system L1 and the second optical systems L2R, L2Ta, and L2Tb. The mirror M functions as a reflective member with a flat reflective surface that changes the traveling direction of a light beam.

The mirror M is movable between a position on an optical path of a light beam emitted from the first optical system L1 and a position not on the optical path thereof. The mirror M is moved by a reflective member moving mechanism (not shown). The reflective member moving mechanism, irrespective of whether it is manually or automatically operated, may be implemented utilizing the related art, and is not described herein.

The mirror M and the reflective member moving mechanism function as an optical path switching mechanism that selectively guides the light beam from the first optical system L1 to either of the single-image second optical system L2R and the plural-image second optical systems L2Ta and L2Tb.

A case has been considered where a light beam is emitted from the liquid crystal panel, for example, in the thus configured projection optical system. In this case, the polarization state of the light beam is not specifically limited, and the light beam may be either s-polarized light or p-polarized light.

In the state in which the mirror M is provided on the optical path of the light beam from the first optical system L1 as shown in FIG. 4A, the light beam emitted from the liquid crystal panel P passes through the dichroic prism PP and the first optical system L1. Then, the first optical system L1 forms an intermediate image II on the basis of the image information on the primary image surface on a surface of the liquid crystal panel P.

At this time, with the mirror M on the optical path, the light beam is reflected by the mirror M to change its traveling direction. The light beam again has its traveling direction changed by a flat reflective surface MR.

This allows the light beam emitted from the first optical system L1 to be guided to the single-image second optical system L2R to be incident on the single-image second optical system L2R. The light beam which has passed through the single-image second optical system L2R is enlarged and projected to form an image on the secondary image surface.

Meanwhile, in the state in which the mirror M is not provided on the optical path of the light beam from the first optical system L1 as shown in FIG. 4B, the light beam emitted from the liquid crystal panels Pa and Pb also passes through the dichroic prism PP and the first optical system L1. It should be noted that image information on the primary image surface has been divided into a plurality of pieces of image information on surfaces of the liquid crystal panels Pa and Pb so as to correspond to a plurality of images (for example, a right-eye image and a left-eye image) to be output for display. The first optical system L1 forms intermediate images IIa and IIb on the basis of the respective pieces of image information on the surfaces of the liquid crystal panels Pa and Pb. That is, an intermediate image IIa is formed on the basis of the light beam emitted from the liquid crystal panel Pa, and an intermediate image IIb is formed on the basis of the light beam emitted from the liquid crystal panel Pb.

It should be noted that the mirror M is not provided on the optical path after the first optical system L1 at this time. That is, the mirror M has been retracted away from the optical path by the reflective member moving mechanism.

Thus, the light beam which has passed through the first optical system L1 has its traveling direction changed by the flat reflective surfaces MTa1, MTb1, MTa2, and MTb2, and is incident on the plural-image second optical systems L2Ta and L2Tb. That is, the light beam emitted from the liquid crystal panel Pa forms the intermediate image IIa, then has its traveling direction changed by the flat reflective surfaces MTa1 and MTa2, and is incident on the plural-image second optical system L2Ta. The light beam emitted from the liquid crystal panel Pb forms the intermediate image IIb, then has its traveling direction changed by the flat reflective surfaces MTb1 and MTb2, and is incident on the plural-image second optical system L2Tb. The respective light beams which have passed through the plural-image second optical systems L2Ta and L2Tb are enlarged and projected to form an image on the secondary image surface.

In the projection optical system configured as described above, the optical path is switched by placing the mirror M in and removing it from the optical path to reflect or not to reflect the light beam. It is selectively determined on the basis of the results of switching the optical path whether to output a single image for display on the screen or to output a plurality of images for display on the screen.

Thus, a liquid crystal projector apparatus which includes the projection optical system configured as described above makes it possible to output both a plurality of images for display and a single image for display with only one liquid crystal projector apparatus without replacing the projection optical system. That is, it is possible to support various video contents, without increasing the cost or the size of the apparatus or incurring troublesome replacement work, by switching the optical path of the light beam by placing the mirror M in and removing it from the optical path.

<Fourth Embodiment>

Figure 5A:
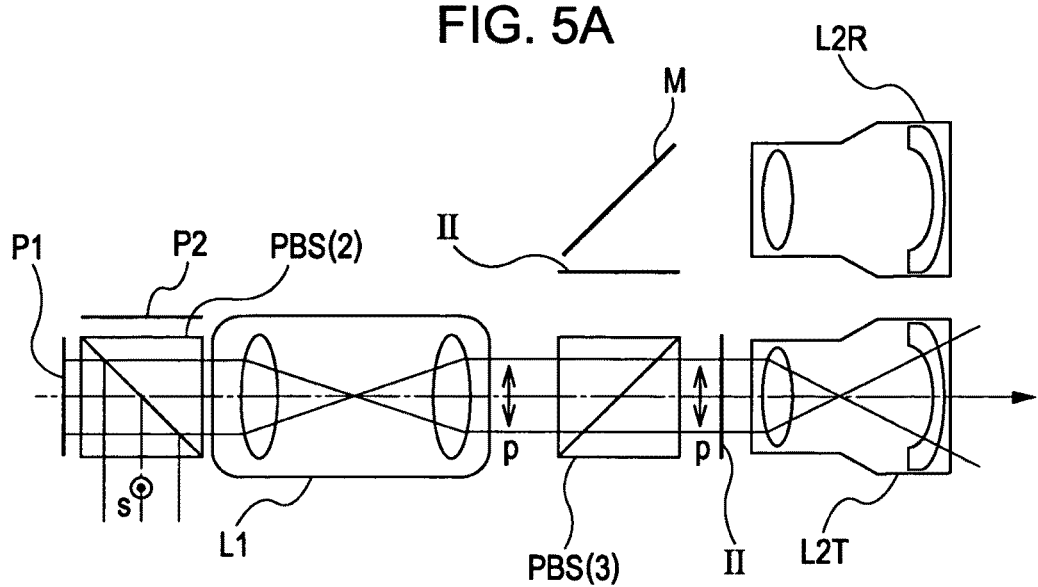
FIG. 5A illustrates an exemplary schematic configuration of a projection optical system according to a fourth embodiment, showing a state in which a light beam containing s-polarized light is incident on a second polarization beam splitter.
Figure 5B:
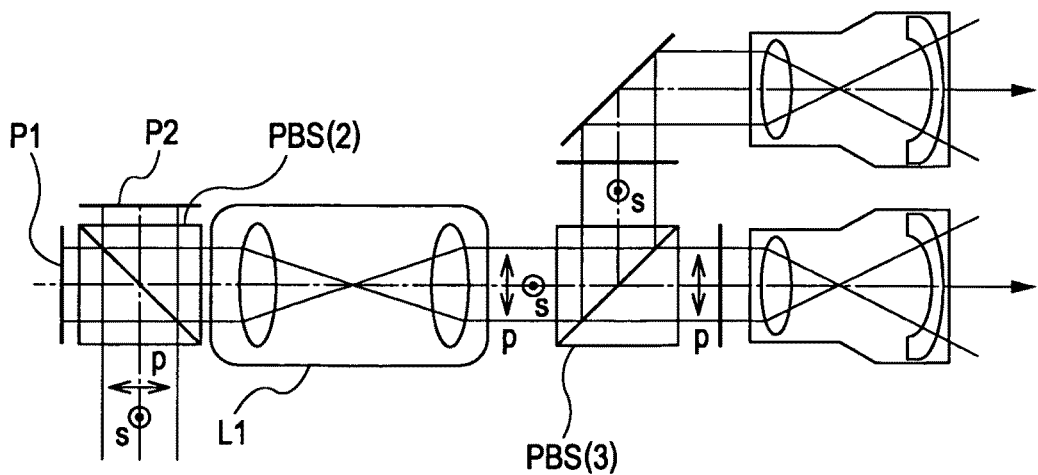
FIG. 5B illustrates an exemplary schematic configuration of the projection optical system according to the fourth embodiment, showing a state in which a light beam obtained by superimposing s-polarized light and p-polarized light is incident on the second polarization beam splitter.

FIGS. 5A and 5B illustrate an exemplary schematic configuration of a projection optical system according to a fourth embodiment. Here, also, only differences from the first embodiment discussed above are described.

In the projection optical system shown, two second optical systems L2R and L2T are provided side by side. The second optical systems L2R and L2T provided side by side function as a plural-image second optical system. One of the second optical systems, L2T, functions also as a single-image second optical system. That is, the second optical system L2T is used as both the single-image second optical system and the plural-image second optical system.

A third polarization beam splitter PBS(3) is disposed between the second optical systems L2R and L2T and the first optical system L1. The polarization beam splitter PBS(3) is configured to reflect an s-polarized light beam and to transmit a p-polarized light beam, for example.

For the thus configured projection optical system, two liquid crystal panels P1 and P2 which serve as image modulation elements are disposed before the first optical system L1. Both the liquid crystal panels P1 and P2 modulate light emitted from the light source and the illumination optical system on the basis of a video signal to form a primary image surface. Although reflective liquid crystal panels P1 and P2 are used in the example shown, transmissive dot-matrix liquid crystal panels or digital micromirror devices (DMDs) may also be used.

Figure 6A:
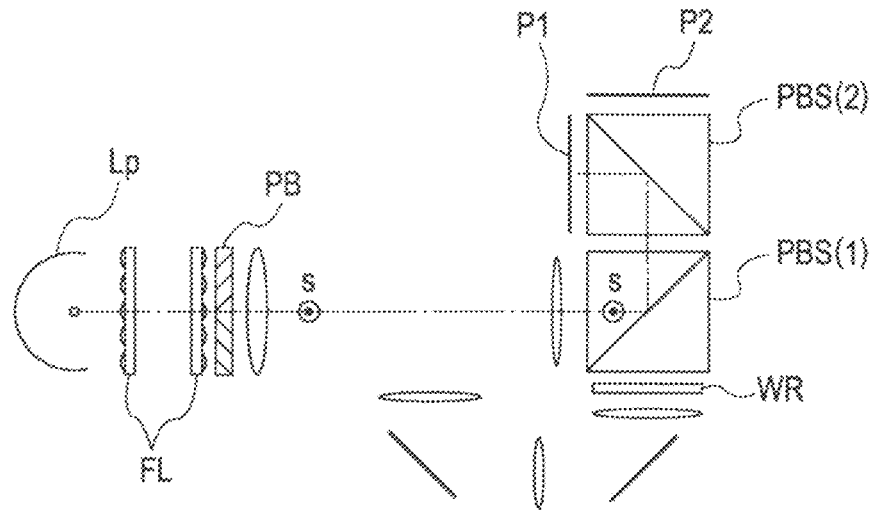
FIG. 6A illustrates an exemplary schematic configuration of an illumination optical system, which includes components from a light source to liquid crystal panels as examples of an image modulation element, according to the fourth embodiment, showing a state in which a half mirror is provided on an optical path of a light beam from the light source.
Figure 6B:
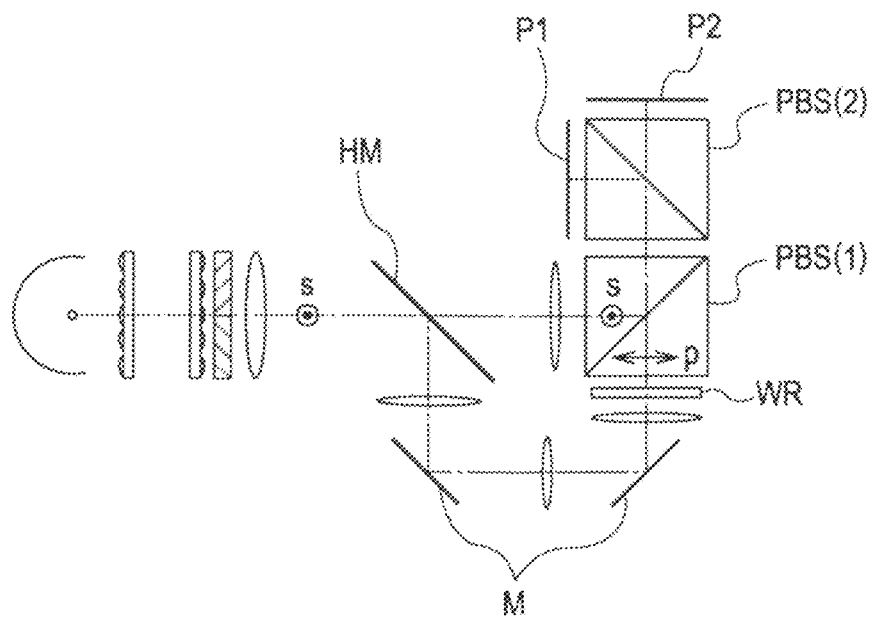
FIG. 6B illustrates an exemplary schematic configuration of the illumination optical system, which includes components from a light source to liquid crystal panels as an example of an image modulation elements, according to the fourth embodiment, showing a state in which the half mirror is not provided on the optical path of the light beam from the light source.

FIGS. 6A and 6B illustrate an exemplary schematic configuration of an illumination optical system, which includes components from a light source to liquid crystal panels as examples of image modulation elements, according to the fourth embodiment.

As in the example shown, a first polarization beam splitter PBS(1) and a second polarization beam splitter PBS(2) are disposed between the liquid crystal panels P1 and P2 and the light source Lp in addition to the fly-eye lenses FL and the polarization beam splitter PB. The first polarization beam splitter PBS(1) and the second polarization beam splitter PBS(2) are configured to reflect an s-polarized light beam and to transmit a p-polarized light beam, for example.

A half mirror HM, mirrors M, and a λ/2 retardation film WR are disposed between the polarization beam splitter PB and the first polarization beam splitter PBS(1).

The half mirror HM splits an incident light beam into two light beams, namely reflected light and transmitted light. The half mirror HM is movable between a position on an optical path between the polarization beam splitter PB and the first polarization beam splitter PBS(1) and a position not on the optical path therebetween. The half mirror HM is moved by a half mirror moving mechanism (not shown). The half mirror moving mechanism, irrespective of whether it is manually or automatically operated, may be implemented utilizing the related art, and is not described herein.

The mirrors M are each configured to have a flat reflective surface that changes the traveling direction of a light beam. The mirrors M each change the traveling direction of one of the light beams split by the half mirror HM.

The λ/2 retardation film WR changes the polarization direction of the light beam, the traveling direction of which has been changed by the mirrors M and which is incident on the first polarization beam splitter PBS(1), to a specific polarization direction. For example, the λ/2 retardation film WR converts s-polarized light into p-polarized light.

A case has been considered where an s-polarized light beam is emitted from the light source Lp, for example, in the projection optical system and the illumination optical system configured as described above. In the drawing, double circle marks indicate s-polarized light (which vibrates in the depth direction in the drawing), and vertical arrows indicate p-polarized light (which vibrates in the vertical direction in the drawing).

In the state in which the half mirror HM is provided on the optical path of the light beam from the light source Lp as shown in FIG. 6A, the light beam from the light source Lp is incident on the first polarization beam splitter PBS(1) as it is. The light beam contains s-polarized light. Thus, the light beam from the light source Lp is reflected by the first polarization beam splitter PBS(1) to be incident on the second polarization beam splitter PBS(2). Further, the light beam is reflected again by the second polarization beam splitter PBS(2) to be incident on the liquid crystal panel P1.

Thereafter, as shown in FIG. 5A, when the light beam containing s-polarized light is incident on the liquid crystal panel P1, a light beam containing p-polarized light is reflected from the liquid crystal panel P1 through modulation performed by the liquid crystal panel P1 on the basis of a video signal, and passes through the first optical system L1. Then, the first optical system L1 forms an intermediate image II on the basis of the image information on the primary image surface on a surface of the liquid crystal panel P1.

The light beam before the third polarization beam splitter PBS(3) contains p-polarized light. Thus, the light beam which has passed through the first optical system L1 passes through the third polarization beam splitter PBS(3) as it is.

The light beam which has passed through the third polarization beam splitter PBS(3) is then incident on the second optical system L2T. The light beam which has passed through the second optical system L2T is enlarged and projected to form an image on the secondary image surface. This causes a single image to be output for display on the screen.

Meanwhile, in the state in which the half mirror HM is not provided on the optical path of the light beam from the light source Lp as shown in FIG. 6B, the light beam from the light source Lp is split by the half mirror HM into two. A first one of the split light beams is incident on the first polarization beam splitter PBS(1) as it is. The first light beam contains s-polarized light. Thus, the first light beam is reflected by the first polarization beam splitter PBS(1) to be incident on the second polarization beam splitter PBS(2). Meanwhile, a second one of the split light beams is reflected by the mirrors M and passes through the λ/2 retardation film WR to be incident on the first polarization beam splitter PBS(1). The second light beam has passed through the λ/2 retardation film WR, and thus contains p-polarized light. Thus, the second light beam passes through the first polarization beam splitter PBS (1) to be incident on the second polarization beam splitter PBS(2). That is, a light beam obtained by superimposing s-polarized light and p-polarized light is incident on the second polarization beam splitter PBS(2).

When the light beam obtained by superimposing s-polarized light and p-polarized light is incident, the second polarization beam splitter PBS(2) reflects a light beam containing s-polarized light, which is contained in the incident light beam. This causes the light beam containing s-polarized light to be incident on the liquid crystal panel P1. The second polarization beam splitter PBS(2) transmits a light beam containing p-polarized light. This causes the light beam containing p-polarized light to be incident on the liquid crystal panel P2.

Thereafter, as shown in FIG. 5B, when the light beam containing s-polarized light is incident on the liquid crystal panel P1, a light beam containing p-polarized light is reflected from the liquid crystal panel P1 through modulation performed by the liquid crystal panel P1 on the basis of a video signal, and passes through the first optical system L1. Meanwhile, when the light beam containing p-polarized light is incident on the liquid crystal panel P2, a light beam containing s-polarized light is reflected from the liquid crystal panel P2 through modulation performed by the liquid crystal panel P2 on the basis of a video signal, and passes through the first optical system L1. Then, the first optical system L1 forms an intermediate image II on the basis of the image information on the primary image surface on a surface of the liquid crystal panel P1 and the image information on the primary image surface on a surface of the liquid crystal panel P2.

The light beam before the third polarization beam splitter PBS(3) contains s-polarized light and p-polarized light superimposed on each other. Thus, the light beam containing s-polarized light, which is contained in the light beam having passed through the first optical system L1, is reflected by the third polarization beam splitter PBS(3) and then by the mirror M to be incident on the second optical system L2R. Meanwhile, the light beam containing p-polarized light, which is contained in the light beam having passed through the first optical system L1, passes through the third polarization beam splitter PBS(3) as it is to be incident on the second optical system L2T. That is, the light beam which has passed through the first optical system L1 is split again by the third polarization beam splitter PBS(3).

The respective light beams which have passed through the second optical systems L2R and L2T are enlarged and projected to form an image on the secondary image surface. This causes a plurality of images to be output for display on the screen.

In the projection optical system configured as described above, the third polarization beam splitter PBS(3) changes whether to guide a light beam from the first optical system L1 to only one of the second optical systems L2R and L2T or to guide the light beam to both of them in accordance with the polarization direction of the light beam. It is selectively determined on the basis of the results of switching the optical path in accordance with the polarization direction of the light beam whether to output a single image for display on the screen or to output a plurality of images for display on the screen.

Thus, a liquid crystal projector apparatus which includes the projection optical system configured as described above makes it possible to output both a plurality of images for display and a single image for display with only one liquid crystal projector apparatus without replacing the projection optical system. That is, it is possible to support various video contents, without increasing the cost or the size of the apparatus or incurring troublesome replacement work, by switching the optical path in accordance with the polarization direction of the light beam.

<Fifth Embodiment>

Figure 7A:
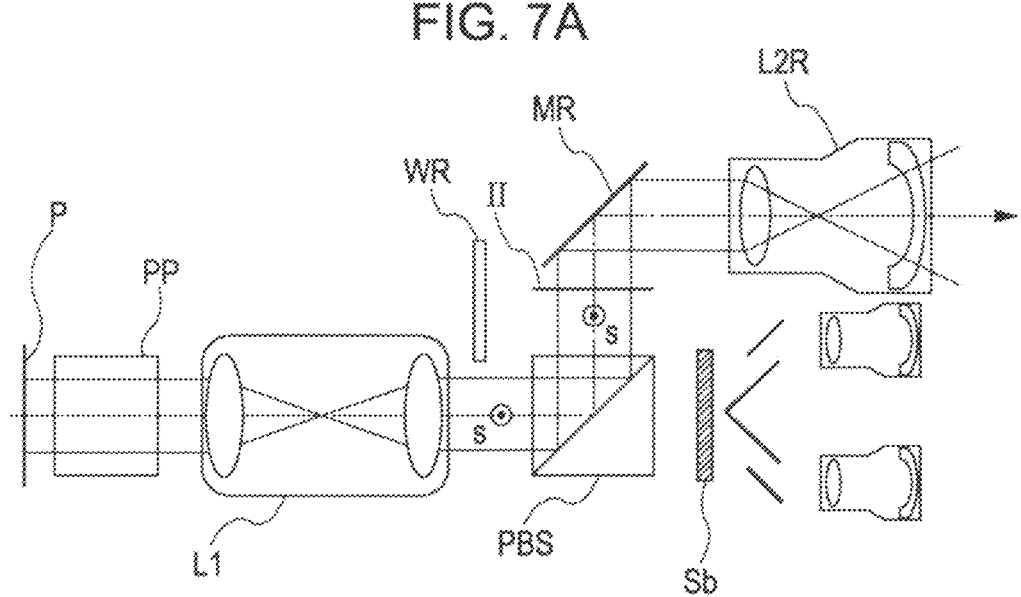
FIG. 7A illustrates an exemplary schematic configuration of a projection optical system according to a fifth embodiment, showing a state in which a light shielding plate is disposed between a polarization beam splitter and plural-image second optical systems.
Figure 7B:
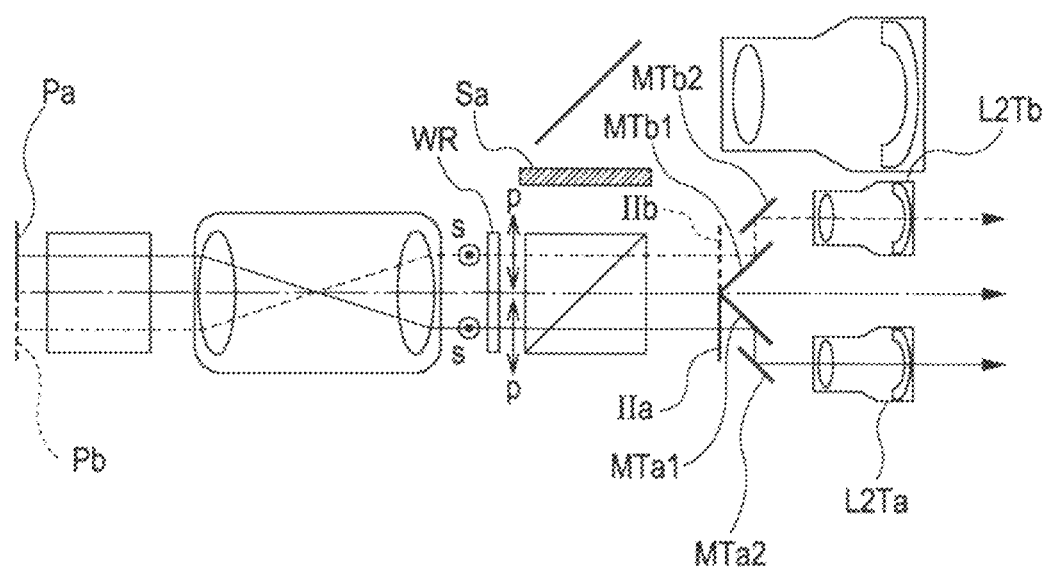
FIG. 7B illustrates an exemplary schematic configuration of the projection optical system according to the fifth embodiment, showing a state in which a light shielding plate is disposed between the polarization beam splitter and a single-image second optical system.

FIGS. 7A and 7B illustrate an exemplary schematic configuration of a projection optical system according to a fifth embodiment. Here, also, only differences from the first embodiment discussed above are described.

In the projection optical system shown, light shielding plates Sa and Sb that prevent light from traveling are disposed between the polarization beam splitter PBS and the second optical system L2R and between the polarization beam splitter PBS and the second optical systems L2Ta and L2Tb, respectively, in addition to the components described in relation to the first embodiment. The light shielding plates Sa and Sb are intended to prevent a light beam from traveling from the first optical system L1 to the single-image second optical system L2R or the plural-image second optical systems L2Ta and L2Tb to which the light beam is not to be guided.

For this purpose, each of the light shielding plates Sa and Sb is movable between a position on an optical path of a light beam from the first optical system L1 and a position not on the optical path thereof. Each the light shielding plates Sa and Sb is moved by a light shielding plate moving mechanism (not shown). The light shielding plate moving mechanism may be adapted to operate in conjunction with an operation of the retardation film moving mechanism to move the λ/2 retardation film WR. The light shielding plate moving mechanism, irrespective of whether it is manually or automatically operated and whether or not it operates in conjunction with the retardation film moving mechanism, may be implemented utilizing the related art, and is not described herein.

In the projection optical system configured as described above, the optical path is switched by placing the λ/2 retardation film WR in and removing it from the optical path in order to change or not change the polarization direction of the light beam. It is selectively determined on the basis of the results of switching the optical path whether to output a single image for display on the screen or to output a plurality of images for display on the screen.

In this case, the light shielding plate Sa or Sb is interposed between the first optical system L1 and the second optical system L2R or the second optical systems L2Ta and L2Tb to which the light beam from the first optical system L1 is not guided in correspondence with switching the optical path by placing the λ/2 retardation film WR on or removing it away from the optical path. This prevents light leakage to the second optical system L2R or the second optical systems L2Ta and L2Tb to which the light beam is not to be guided in the case where the second optical systems L2R and L2Ta and L2Tb are provided side by side and the light beam is selectively guided to the second optical system L2R or the second optical systems L2Ta and L2Tb. Thus, it is possible to prevent the occurrence of degradation of a displayed image due to light leakage.

<Sixth Embodiment>

Now, images output for display using a projection optical system are described by way of specific examples as a sixth embodiment. The description below is based on a case where the projection optical system configured as described in relation to the first embodiment is used, for example. It should be noted, however, that the projection optical system may be configured as in any of the first to fifth embodiments discussed above.

FIGS. 8A and 8B to 11A and 11B illustrate specific examples of a primary image surface and a secondary image surface.

Figure 8A:
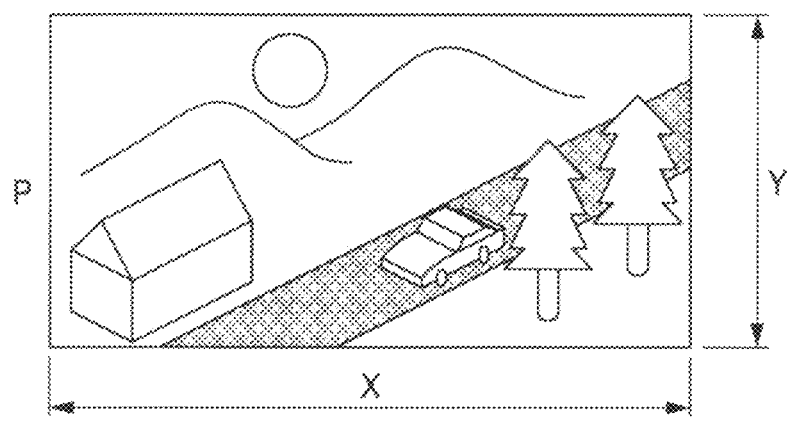
FIG. 8A illustrates a first specific example of a primary image surface.

FIG. 8A shows image information on the primary image surface on a surface of the liquid crystal panel P obtained in the case where a single image is output for display, as viewed from the secondary image surface side. The liquid crystal panel P is defined to have a horizontal dimension X and a vertical dimension Y.

Figure 8B:
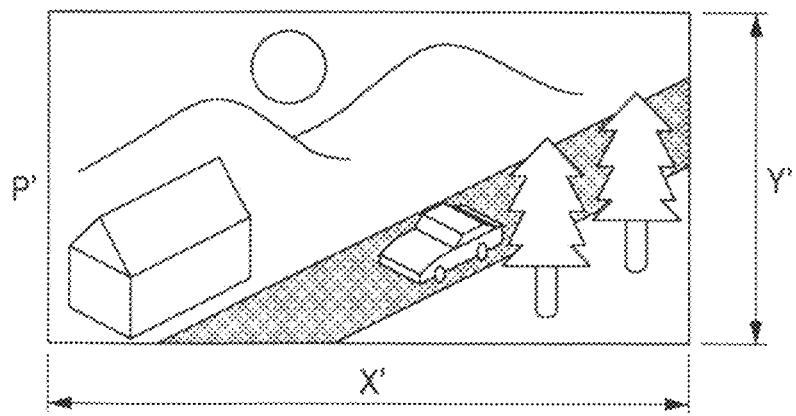
FIG. 8B illustrates a first specific example of a secondary image surface.

In the case where a single image is output for display, image information on the primary image surface on a surface of the liquid crystal panel P is treated by the first optical system L1 and the single-image second optical system L2R to form image information P' on the secondary image surface as shown in FIG. 8B. The horizontal dimension X' and the vertical dimension Y' of the image information P' on the secondary image surface are defined as $X'=X \cdot \beta 1 \cdot \beta 2R$ and $Y'=Y \cdot \beta 1 \cdot \beta 2R$, where $\beta 1$ is the imaging magnification of the first optical system L1 and $\beta 2R$ is the imaging magnification of the single-image second optical system L2R.

Figure 9A:
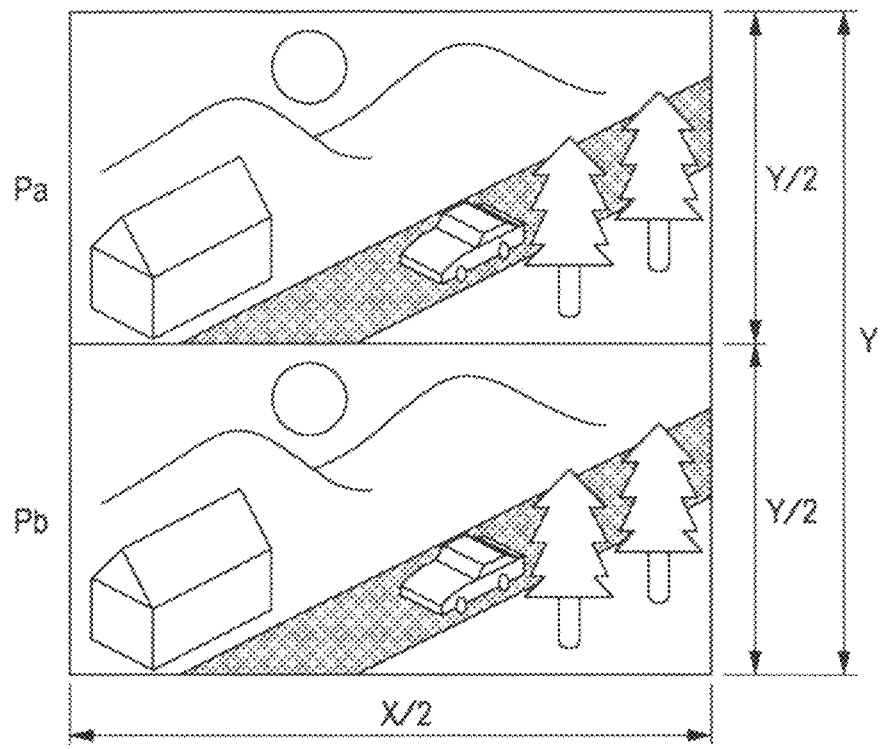
FIG. 9A illustrates a second specific example of the primary image surface.

FIG. 9A shows image information on the primary image surface on respective surfaces of the liquid crystal panels Pa and Pb obtained in the case where a plurality of images are output for display, as viewed from the secondary image surface side. The liquid crystal panels Pa and Pb are each defined to have a horizontal dimension X/2 and a vertical dimension Y/2.

Figure 9B:
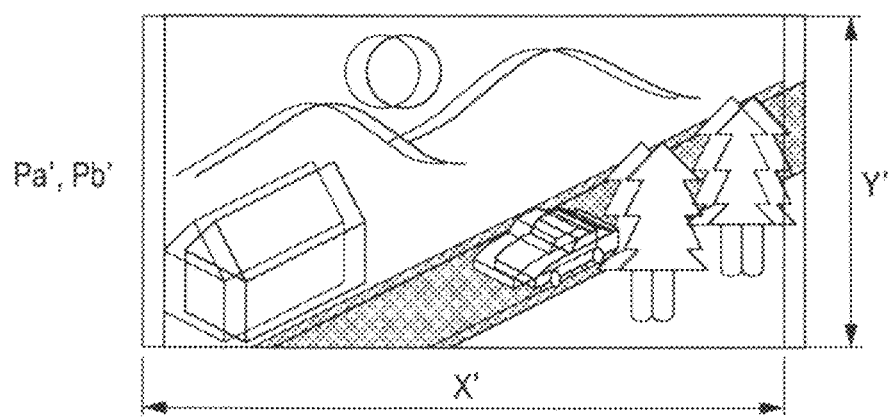
FIG. 9B illustrates a second specific example of the secondary image surface.

In the case where a plurality of images are output for display, image information on the primary image surface on surfaces of the liquid crystal panels Pa and Pb is treated by the first optical system L1 and the plural-image second optical systems L2Ta and L2Tb to form image information Pa' and Pb' on the secondary image surface as shown in FIG. 9B. The respective focal lengths of the single-image second optical system L2R and the plural-image second optical systems L2Ta and L2Tb are defined as f2R, f21T, and f22T. A case has been considered where f2R is equal to 2×f21T and f21T is equal to f22R. In this case, if the respective imaging magnifications of the single-image second optical system L2R and the plural-image second optical systems L2Ta and L2Tb are defined as $\beta 2R$, $\beta 2Ta$, and $\beta 2Tb$, $2 \times \beta 2R$ is equal to $\beta 2Ta$ and β2Ta is equal to β2Tb. Thus, it is possible to form an image of the same size as the image formed in the case of an output for display of a single image discussed above (see FIG. 8B).

In the case of an output for display of a plurality of images, it is possible to display a stereoscopic image on the screen by projecting an image from the liquid crystal panel Pa as a left-eye image and an image from the liquid crystal panel Pb as a right-eye image, for example, with parallax provided between the images.

Figure 10A:
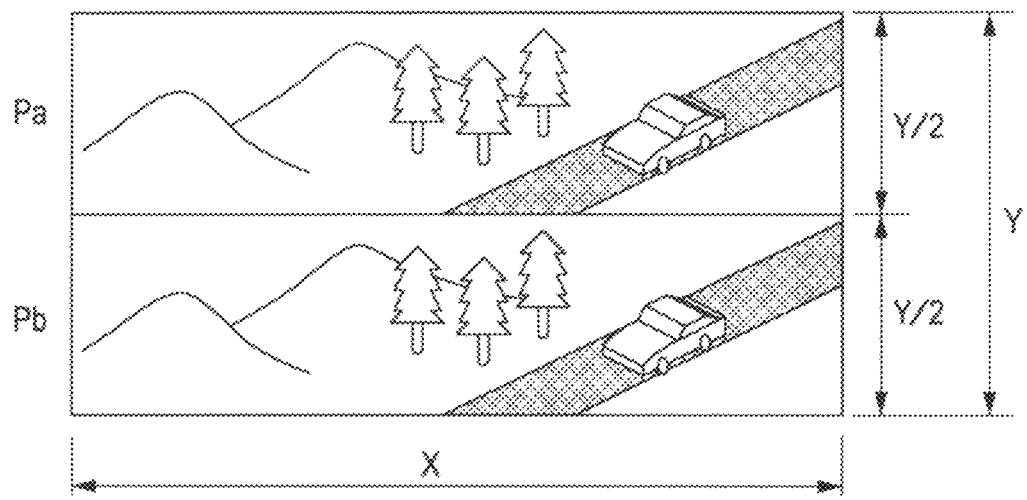
FIG. 10A illustrates a third specific example of the primary image surface.
Figure 10B:
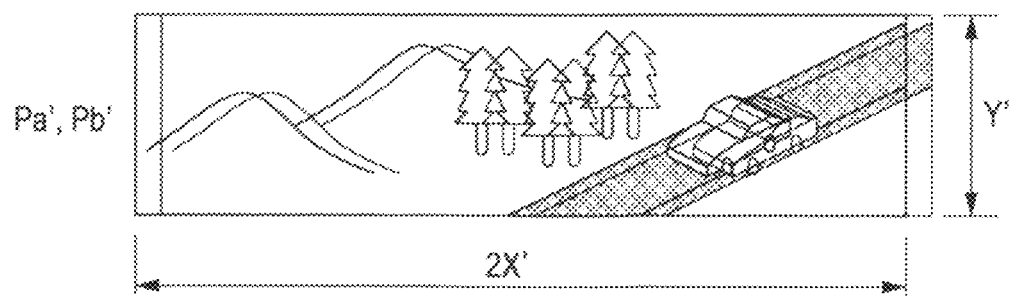
FIG. 10B illustrates a third specific example of the secondary image surface.

Although images are displayed with the same aspect ratio as the aspect ratio of the single image shown in FIGS. 8A and 8B in the specific example of FIGS. 9A and 9B, the aspect ratio of the liquid crystal panels Pa and Pb may be different, and the horizontal dimension and the vertical dimension of the liquid crystal panels Pa and Pb may be X and Y/2, respectively. In this case, the horizontal dimension of the secondary image surface is X' as shown in FIG. 10B.

Figure 11A:
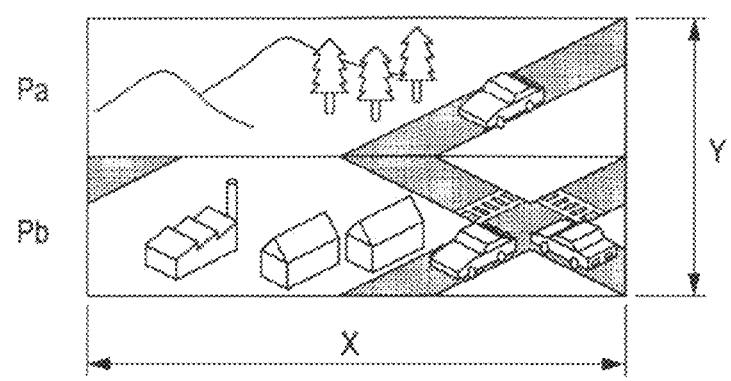
FIG. 11A illustrates a fourth specific example of the primary image surface.

FIG. 11A shows another specific example of image information on the primary image surface on respective surfaces of the liquid crystal panels Pa and Pb obtained in the case where a plurality of images are output for display, as viewed from the secondary image surface side.

Figure 11B:
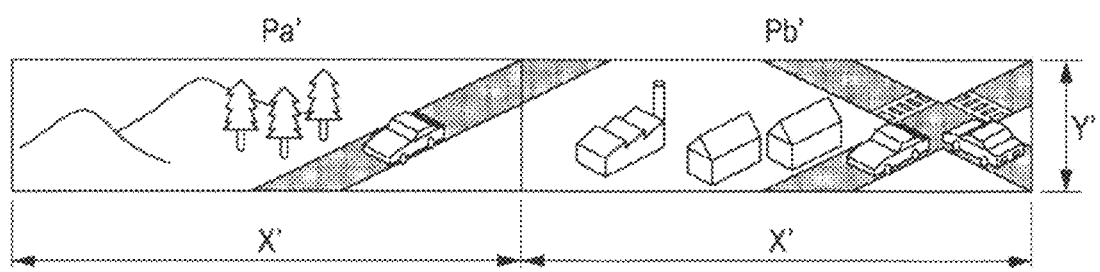
FIG. 11B illustrates a fourth specific example of the secondary image surface.

Image information on the primary image surface on surfaces of the liquid crystal panels Pa and Pb passes through the first optical system L1 and the plural-image second optical systems L2Ta and L2Tb to form image information Pa' and Pb' on the secondary image surface as shown in FIG. 11B. The image information Pa' and the image information Pb' are used as a left screen and a right screen, respectively, and are arranged adjacent to each other to display an image with a wide viewing angle in the horizontal direction. The dotted line generally at the center of the image information Pa' and Pb' indicates the seam between the images. At the seam, for example, the image information Pa' and the image information Pb' may partially overlap each other and be subjected to an edge blending process according to the related art to connect the left and right images in a natural way.

As described above, it is possible to split image information modulated by the primary image surface into a plurality of pieces of image information to output a plurality of images for display on the secondary image surface by switching the optical path to output a plurality of images for display using the projection optical system described in relation to any of the first to fifth embodiments.

It is possible to display a stereoscopic image, in particular, when the plurality of pieces of the image information modulated by the primary image surface and then split contain a left-eye image and a right-eye image, and the left-eye image and the right-eye image are displayed on the secondary image surface in an overlapping manner with parallax between each other. In this case, a stereoscopic image may be displayed utilizing schemes discussed below. For example, the plurality of pieces of the image information modulated by the primary image surface and then split may contain linearly polarized light components that are perpendicular to each other or circularly polarized light components that rotate in opposite directions to each other. That is, a stereoscopic image may be displayed utilizing a so-called polarization scheme. Alternatively, the plurality of pieces of the image information modulated by the primary image surface and then split may have different spectrum characteristics from each other. That is, a stereoscopic image may be displayed utilizing a so-called color segmentation scheme.

It is also possible to dispose an image modulation element on the intermediate image to cause it operate in sync with the image modulation element disposed on the primary image surface, or to perform so-called two-stage modulation.

It is also possible to display a so-called ultra-wide image with a wide viewing angle in the horizontal direction, rather than a stereoscopic image, by displaying the plurality of pieces of the image information modulated by the primary image surface and then split adjacent to each other in the horizontal direction on the secondary image surface. In this case, an ultra-wide image may be displayed utilizing schemes discussed below. For example, the display position of the secondary image surface may be moved with respect to the center of the image modulation element on which an image is formed by the first optical system L1 by moving the first optical system L1 with respect to the display surface of the image modulation element in parallel therewith. That is, an ultra-wide image may be displayed using a shift mechanism for the first optical system L1. Alternatively, the display position of the secondary image surface may be moved with respect to the center of the image modulation element on which an image is formed by the first optical system L1 by moving the second optical systems L2Ta and L2Tb with respect to the display surface of the image modulation element in parallel therewith. That is, an ultra-wide image may be displayed using a shift mechanism for the second optical systems L2Ta and L2Tb.

In either case, a light beam separation prism that enables output of a plurality of images for display is desirably shaped such that each of its reflective surfaces satisfies conditions for total reflection.

<Seventh Embodiment>

Now, suitable conditions for constructing a projection optical system are described by way of specific examples as a seventh embodiment. The description below is based on a case where the projection optical system configured as described in relation to the first embodiment is used, for example. It should be noted, however, that the projection optical system may be configured as in any of the first to fifth embodiments discussed above.

In the projection optical system, the imaging magnification β1 of the first optical system L1 desirably satisfies the following conditional expression (1):

$$0.4 < \beta 1 < 2.5 \quad (1)$$

The above conditional expression (1) prescribes the lower limit and the upper limit of the imaging magnification β1 of the first optical system L1. In the case where the imaging magnification β1 is less than the lower limit, the numerical aperture with respect to the second optical system is great while the display size of the intermediate image is small. Therefore, the size of the second optical system is increased or the number of lenses forming the second optical system is increased to secure excellent imaging performance. Meanwhile, in the case where the imaging magnification β1 more than the upper limit, the display size of the intermediate image is great while the numerical aperture with respect to the second optical system is small. This also increases the size of the second optical system or the number of lenses forming the second optical system. For the above reasons, the imaging magnification β1 of the first optical system L1 desirably satisfies the above conditional expression (1).

For the λ/2 retardation film WR for switching the optical path, the angle θ1 of a light beam incident on the λ/2 retardation film WR desirably satisfies the following conditional expression (2):

$$-15° < \theta 1 < 15° \quad (2)$$

The above conditional expression (2) prescribes the lower limit and the upper limit of the angle θ1 of linearly polarized light incident on the λ/2 retardation film WR. In the case where the upper or lower limit is exceeded, the linearly polarized light rotates significantly, which may make it difficult for the polarization beam splitter PBS to efficiently split the light beam.

In the projection optical system, the exit pupil position P1 of the first optical system L1 and the entrance pupil position P2 of the single-image second optical system L2R and the plural-image second optical systems L2Ta and L2Tb desirably satisfy the following conditional expression (3):

$$0.8<|P1/P2|<1.2 \quad (3)$$

The above conditional expression (3) defines the second optical systems L2R, L2Ta, and L2Tb to be each a non-telecentric optical system, reducing their size. In this case, it is necessary that the pupils of the first optical system L1 and the second optical systems L2R, L2Ta, and L2Tb should match each other. Thus, in the case where the upper or lower limit prescribed by the above conditional expression (3) is exceeded, excellent imaging performance may not be achieved. Hence, it is desirable that the above conditional expression (3) should be satisfied.

In the case of selectively supporting a display output of a single image and a display output of a plurality of images, it is desirable to match the display screen size between both the cases. In view of the above, in the projection optical system, the focal length f2R of the single-image second optical system L2R and the focal length f2T of the plural-image second optical systems L2Ta and L2Tb desirably satisfy the following conditional expression (4):

$$0.8<f2R/f2T<1.2 \quad (4)$$

The above conditional expression (4) prescribes the lower limit and the upper limit of the ratio of the focal length f2R to the focal length f2T. If the ratio is in the range between the lower and upper limits prescribed by the conditional expression (4), it is possible to make the display screen size generally equal between the case of supporting a display output of a single image and the case of supporting a display output of a plurality of images.

In the case where the second optical system L2Ta equivalent to a second-first optical system and the second optical system L2Tb equivalent to a second-second optical system are provided as the plural-image second optical systems L2Ta and L2Tb, it is desirable that the following conditional expressions (5) and (6) should be satisfied:

$$0.8<f21T/f22T<1.2 \quad (5); \text{ and}$$

$$1.5<f2R/f21T<2.5 \quad (6)$$

In the above conditional expressions (5) and (6), the symbol "f2R" denotes the focal length of the single-image second optical system L2R. The symbol "f21T" denotes the focal length of the second optical system L2Ta equivalent to the second-first optical system, that is, the focal length of a second optical system located in the traveling direction of a second-first T light beam. The symbol "f22T" denotes the focal length of the second optical system L2Tb equivalent to the second-second optical system, that is, the focal length of a second optical system located in the traveling direction of a second-second T light beam.

The above conditional expressions (5) and (6) indicate conditions for matching the screen size between two light beams formed through transmission and splitting. In the case of matching the screen size between two light beams formed through reflection and splitting, the following conditional expressions (7) and (8) are satisfied:

$$0.8<f21R/f22R<1.2 \quad (7); \text{ and}$$

$$1.5<f2T/f21R<2.5 \quad (8)$$

In the above conditional expressions (7) and (8), the symbol "f21R" denotes the focal length of a second optical system located in the traveling direction of a second-first R light beam. The symbol "f22R" denotes the focal length of a second optical system located in the traveling direction of a second-second R light beam.

In the case of matching the screen size between four light beams formed through transmission and reflection, the following conditional expressions (9) to (11) are satisfied:

$$0.8<f21T/f22T<1.2 \quad (9);$$

$$0.8<f21T/f21R<1.2 \quad (10); \text{ and}$$

$$0.8<f21T/f22R<1.2 \quad (11)$$

The above conditional expressions (5), (7), (9), (10), and (11) prescribe the lower limit and the upper limit of the ratio between the focal length of the second optical system located in the traveling direction of the second T light beam and the focal length of the second optical system located in the traveling direction of the second R light beam. In the case where the prescribed upper or lower limit is exceeded, the screen size on the secondary image surface may be significantly different between both the light beams, which may be inconvenient for stereoscopic display or to arrange the screens side by side.

The above conditional expressions (6) and (8) prescribe the lower limit and the upper limit of the ratio between the focal length of the second optical system located in the traveling direction of the second T light beam and the focal length of the second optical system located in the traveling direction of the second R light beam, either of which has been further split into two traveling directions. In the case where the prescribed upper or lower limit is exceeded, the screen size may be significantly different between stereoscopic screen display and single screen display, for example. This may be inconvenient for a space where a screen has already been installed, such as movie theaters and home theater systems.

Although the present invention has been described by way of specific preferred examples in relation to the first to seventh embodiments discussed above, the present invention is not limited thereto.

That is, specific shapes and values of respective components exemplified in relation to the first to seventh embodiments are merely illustrative of an exemplary implementation of the present invention, and should not be construed as limiting the technical scope of the present invention.

For example, although a liquid crystal projector apparatus is described as an example of a projection image display apparatus in relation to each embodiment discussed above, the present invention is equally applicable to other projection image display apparatuses, that is, projection image display apparatuses that use image modulation elements other than liquid crystal panels.

As described above, the present invention is not limited to the illustrated embodiments, and may be modified appropriately without departing from the scope and sprit of the present invention.

What is claimed is:

1. A projection image display apparatus comprising:
a light source;
an illumination optical system that uniformly irradiates a surface of an image modulation element, which serves as a primary image surface, with a light beam emitted from the light source; and
a projection optical system that enlarges and projects image information on the primary image surface modulated by the image modulation element onto a screen which serves as a secondary image surface,
wherein the projection optical system includes
a first optical system that forms an intermediate image on the basis of the image information on the primary image surface;
a single-image second optical system that enlarges and projects the intermediate image to output a single image for display on the screen;
a plural-image second optical system that enlarges and projects the intermediate image to output a plurality of images for display on the screen; and
an optical path switching mechanism that selectively guides a light beam from the first optical system to either of the single-image second optical system and the plural-image second optical system.

2. The projection image display apparatus according to claim 1,
wherein an imaging magnification β1 of the first optical system satisfies the following relationship:

$$0.4<\beta1<2.5. \quad (1)$$

3. The projection image display apparatus according to claim 1,
wherein the optical path switching mechanism includes:
a polarization beam splitter that guides the light beam from the first optical system to either of the single-image second optical system and the plural-image second optical system in accordance with a polarization direction of the light beam.

4. The projection image display apparatus according to claim 3,
wherein the optical path switching mechanism includes:
a retardation film that changes the polarization direction of the light beam from the first optical system to a specific polarization direction.

5. The projection image display apparatus according to claim 4,
wherein an angle θ1 of a light beam incident on the retardation film satisfies the following relationship:

$$-15°<\theta1<15°. \quad (2)$$

6. The projection image display apparatus according to claim 1,
wherein the optical path switching mechanism includes:
a reflective member with a reflective surface that changes a traveling direction of the light beam from the first optical system.

7. The projection image display apparatus according to claim 1,
wherein the optical path switching mechanism includes:
a light shielding plate that prevents light from traveling to the single-image second optical system or the plural-image second optical system to which the light beam from the first optical system is not guided.

8. The projection image display apparatus according to claim 1,
wherein an exit pupil position P1 of the first optical system and an entrance pupil position P2 of the single-image second optical system and the plural-image second optical system satisfy the following relationship:

$$0.8<|P1/P2|<1.2. \quad (3)$$

9. The projection image display apparatus according to claim 1,
wherein a focal length f2R of the single-image second optical system and a focal length f2T of the plural-image second optical system satisfy the following relationship:

$$0.8<f2R/f2T<1.2. \quad (4)$$

10. The projection image display apparatus according to claim 1,
wherein the plural-image second optical system includes:
a plurality of second optical systems, the number of which corresponds to the number of the plurality of images; and
an optical member that splits a light beam to be guided to the plural-image second optical system into a plurality of light beams, the number of which corresponds to the number of the plurality of second optical systems.

11. The projection image display apparatus according to claim 10,
wherein in the case where the plural-image second optical system outputs two images for display and a second-first optical system and a second-second optical system are provided as the plurality of second optical systems, a focal length f2R of the single-image second optical system, a focal length f21T of the second-first optical system, and a focal length f22T of the second-second optical system satisfy the following relationship:

$$0.8<f21T/f22T<1.2; \quad (5) \text{ and}$$

$$1.5<f2R/f21T<2.5. \quad (6)$$

12. A projection optical system comprising:
a first optical system that forms an intermediate image on the basis of image information on a primary image surface modulated by an image modulation element;
a single-image second optical system that enlarges and projects the intermediate image to output a single image for display on a screen which serves as a secondary image surface;
a plural-image second optical system that enlarges and projects the intermediate image to output a plurality of images for display on the screen; and
an optical path switching mechanism that selectively guides a light beam from the first optical system to either of the single-image second optical system and the plural-image second optical system.

* * * * *